April 2, 1935.  M. H. HOLLINGSWORTH  1,996,203

DRINKING STRAW

Filed July 11, 1931

Inventor

M. H. Hollingsworth

By Clarence A. O'Brien
Attorney

Patented Apr. 2, 1935

1,996,203

UNITED STATES PATENT OFFICE 1,996,203

DRINKING STRAW

Maurice H. Hollingsworth, Miami Beach, Fla.

Application July 11, 1931, Serial No. 550,263

1 Claim. (Cl. 99—16)

This invention relates to a straw or tube used in a glass containing water or other liquid, the general object of the invention being to provide the interior of the straw with a coating of soluble flavoring material so that when the straw is used the material will flavor the liquid being drawn therethrough.

This invention also consists in certain other features of construction and in the combination and arrangement of the several parts to be hereinafter fully described and specifically pointed out in the appended claim.

In describing the invention in detail, reference will be had to the accompanying drawing wherein like characters denote like or corresponding parts throughout the several views, and in which:—

Figure 1:
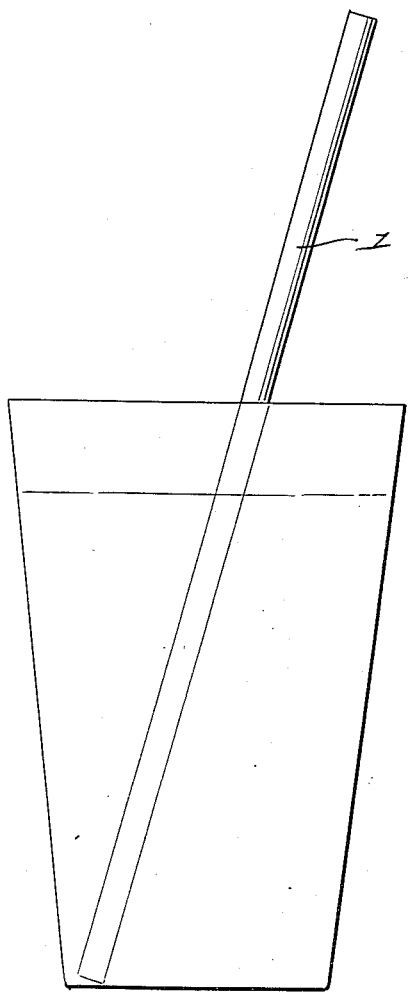
Figure 1 is a view showing the straw in a glass of liquid.
Figure 2:
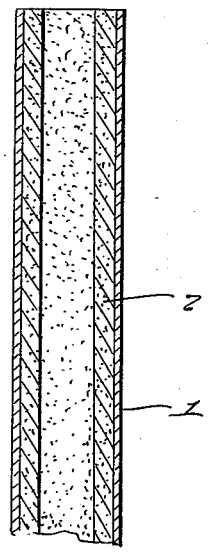
Fig. 2 is a fragmentary longitudinal sectional view through the straw.
Figure 3:
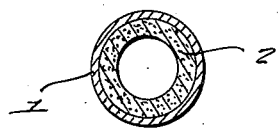
Fig. 3 is a transverse sectional view therethrough.

In these views, the numeral 1 indicates the straw which is formed of any suitable material, and the numeral 2 indicates the coating of soluble flavoring material. This coating can be formed in any suitable manner. The syrup now used in soda fountains can be flavored with any suitable flavoring extract, fruit juice or the like, and the straw filled with the solution after which the straw is placed in an upright position, so that the major part of the solution will drain therefrom but will leave a coating upon the internal walls of the straw.

This coating will dry and then when the straw is used, it will dissolve in the liquid being drawn through the straw and thus flavor the same. Preferably, the straws are made of cellular material which may be grained, or pitted to hold some of the solution or to furnish a key for the adherence of the syrup.

For instance, the straw may be coated with lemon, lime, cherry and other flavors and then when the straw is used to draw water from a glass, the water will be colored. Of course, the straw can be used for drinking "Coca-Cola" and other beverages, and the flavoring coating on the straw will impart its flavoring to said beverage.

For instance, a straw having a lime flavoring coating therein, placed in "Coca-Cola" will give the "Coca-Cola" a lime taste. These straws will be very valuable to campers as they will flavor the drinks used by the campers, so that the campers can flavor their drinking water as they desire.

It is thought from the foregoing description that the advantages and novel features of the invention will be readily apparent.

It is to be understood that changes may be made in the construction and in the combination and arrangement of the several parts, provided that such changes fall within the scope of the appended claim.

Having thus described my invention, what I claim as new is:—

A drinking straw of non-edible material and of ordinary or any suitable construction having a dry coating on its internal walls of soluble flavoring material for flavoring liquid drawn through the straw.

MAURICE H. HOLLINGSWORTH.